United States Patent
Paniscotti et al.

(10) Patent No.: US 7,954,108 B2
(45) Date of Patent: May 31, 2011

(54) METHOD AND APPARATUS FOR ACCELERATING GENERIC INTER-ORB PROTOCOL FOR A CORBA ORB

(75) Inventors: Dominick Paniscotti, Totowa, NJ (US); Frederick C. Humcke, Long Valley, NJ (US); Shahzad Aslam-Mir, San Diego, CA (US)

(73) Assignee: PrismTech Corporation, Woburn, MA (US)

( * ) Notice: Subject to any disclaimer, the term of this patent is extended or adjusted under 35 U.S.C. 154(b) by 1226 days.

(21) Appl. No.: 11/562,367

(22) Filed: Nov. 21, 2006

(65) Prior Publication Data

US 2007/0130570 A1 Jun. 7, 2007

Related U.S. Application Data

(60) Provisional application No. 60/738,862, filed on Nov. 21, 2005.

(51) Int. Cl.
*G06F 9/44* (2006.01)
(52) U.S. Cl. .......................... 719/311; 719/315; 719/330
(58) Field of Classification Search .................. 719/311, 719/330, 315
See application file for complete search history.

(56) References Cited

U.S. PATENT DOCUMENTS

| | | | |
|---|---|---|---|
| 6,633,923 B1 | | 10/2003 | Kukura et al. |
| 6,665,725 B1 * | | 12/2003 | Dietz et al. ..................... 709/230 |
| 6,718,550 B1 * | | 4/2004 | Lim et al. ........................ 710/310 |
| 7,415,713 B2 * | | 8/2008 | Kukura et al. ................. 719/316 |
| 7,530,074 B1 * | | 5/2009 | Snodgrass ..................... 719/311 |
| 7,774,801 B1 * | | 8/2010 | Fitkin ............................ 719/330 |
| 2003/0229482 A1 | | 12/2003 | Cook et al. |

OTHER PUBLICATIONS

PCT/US2006/061174, Search Report and Written Opinion of International Searching Authority dated Mar. 14, 2008.

* cited by examiner

*Primary Examiner* — Van H Nguyen
(74) *Attorney, Agent, or Firm* — Baker & McKenzie LLP

(57) ABSTRACT

An HDL description of a communications protocol machine for transforming object communications into low-level octet sequences for physical transport is synthesized onto a programmable logic device such as an FPGA. This communications protocol machine replaces traditional software-based inter-ORB protocol engines in distributed computing environments, including embedded environments, to provide reduced latency. The communications protocol machine is described with two distinct elements: a protocol messaging machine and an encoder/decoder. The protocol messaging machine converts an object communication into a low-level octet sequence comprising one or more inter-ORB protocol messages and converts a low-level octet sequence comprising an inter-ORB protocol message into an object communication. The encoder/decoder encodes each data type associated with the object communication into a low-level octet sequence according to a set of rules, such as CDR, and decodes a low-level octet sequence into data types associated with the object communication according to the same rules.

32 Claims, 6 Drawing Sheets

METHOD AND APPARATUS FOR ACCELERATING GENERIC INTER-ORB PROTOCOL FOR A CORBA ORB

CROSS-REFERENCE TO RELATED APPLICATIONS

This application claims priority to U.S. Provisional Application No. 60/738,862 filed Nov. 21, 2005 and entitled "Method and Apparatus for Accelerating Generic Inter ORB Protocol for a CORBA ORB" which is hereby incorporated by reference in its entirety.

TECHNICAL FIELD

The present disclosure generally relates to communications between object request brokers (ORBs) in distributed and embedded environments and specifically relates to methods for reducing communications overhead by accelerating inter-ORB protocol messaging.

BACKGROUND

In distributed computing, an object request broker (ORB) is middleware used to abstract the communications between software object implementations. When a client sends a request to a server object implementation, the ORB is responsible for locating the server object implementation, for preparing the server object implementation to receive the request, and for transforming the request into a format suitable for transport to the server object implementation. An ORB on the server side is responsible for reconstituting the request for dispatch to the server object implementation. In distributed computing systems utilizing ORBs, the client need only be aware of those aspects of the server object implementation that are reflected in the server object implementation's interface.

Using an ORB, a client can transparently invoke a method on a server object implementation, whether that server object implementation is located on the same machine as the client or is located across a network. The ORB intercepts the communication, locates the server object implementation, transforms the outgoing communication into a format suitable for transport, and reconstitutes any incoming communication from the server object implementation into a format suitable for dispatch back to the client. Thus, ORBs provide interoperability between applications on different machines in heterogeneous distributed environments and seamlessly interconnect multiple object systems.

In order to achieve such interoperability, ORBs must communicate using a standardized communications protocol known as an inter-ORB protocol. The ORB on the server side must "speak the same language" as the ORB on the client side to ensure proper message interpretation. One such inter-ORB protocol is the General Inter-ORB Protocol (GIOP) as specified by the Object Management Group (OMG) in version 3.0 of its Common Object Request Broker Architecture (CORBA) specification, hereby incorporated by reference in its entirety into the specification of this patent application. The GIOP is designed such that it can be mapped onto any physical transport protocol that meets a minimal set of assumptions. Included in this minimal set of assumptions is that the transport must be connection-oriented, the transport must be reliable, and the transport must be viewable as a low-level octet stream. A low-level octet stream is an uninterpreted sequence of 8-bit octets, and is also referred to as a byte stream. Examples of connection-oriented transport protocols include Transmission Control Protocol (TCP) and Reliable User Datagram Protocol (RUDP). Examples of physical layer transport protocols include Ethernet and RapidIO.

Ethernet-based TCP's latency in highly embedded environments has been cause for concern, especially where the system has a high degree of sensitivity to loss of determinism in request and response latency. As recently as five years ago, examination of the percentage of time spent in the transport stack compared to time spent in the ORB indicated that anywhere from 70-85% of the time was spent in transport compared to only 12-15% spent in the ORB. So ORB overhead was relatively low. More recently, however, the introduction of faster shared memory-based fabric transports and newer fabric standard implementations such as those of RapidIO has caused a reversal in the latency picture. Using such transports, we see 80-90% of total call time now appearing to be in the ORB and far less time now in the transports. Although these faster, more predictable, and deterministic transports have become available, the ORBs have stayed somewhat static in their designs.

Examination of the time spent in an ORB has typically shown that the most CPU intensive and greatest contributor to latency is the ORB's marshalling engine. The marshalling engine is an inter-ORB protocol engine that translates wire traffic from the transport into ORB communications and vice-versa. Because it is desirable to lower call latency as much as possible, and because traditional techniques have focused purely on software based mechanisms and on performing intelligent operations in search of faster, leaner, and more effective GIOP implementations over various transports, a novel approach is desired to accelerate the inter-ORB protocol engine and thus reduce latency.

In computing environments comprising distributed software objects running on processors and hardware objects residing in silicon, custom proxies known as hardware abstraction layers (HALs) have been developed to establish communications between the processors and the hardware objects. These custom proxies are meant to increase portability and re-use, but in practice, they tend to increase latency, reduce throughput and lower re-use. Another communication solution has been to embed general purpose processing cores into hardware platforms alongside the hardware objects in order to offer software-based ORB capability. This approach tends to require significant gate count and memory utilization and generally these processing cores cannot be clocked fast enough to deal with ever-increasing performance requirements. A novel approach is needed to facilitate communications between software objects running on processors and hardware objects residing in silicon.

BRIEF SUMMARY

One aspect of the disclosed invention is to provide a method to accelerate the inter-ORB protocol by providing a hardware description language (HDL) description of a communications protocol machine. In an exemplary embodiment, the communications protocol machine transforms object communications into low-level octet sequences for transport, and restores low-level octet sequences into object communications for dispatch to object implementations. In some embodiments, the communications protocol machine further asserts handshaking signals effectuating dispatch of the object communications to object implementations. In preferred embodiments, the HDL description of the communications protocol machine is then synthesized onto a hardware platform, such as a field programmable gate array (FPGA), and implemented as an inter-ORB protocol engine. In an exemplary embodiment, a communications protocol machine is described that transforms object communications into low-level octet sequences comprising General Inter-ORB Protocol (GIOP) messages and encodes data types associated with the object communications using Common Data Representation (CDR).

DETAILED DESCRIPTION

Various aspects of a method and apparatus for accelerating GIOP protocol according to the present disclosure are described. It is to be understood, however, that the following explanation is merely exemplary in describing aspects of the present disclosure. Accordingly, several modifications, changes, and substitutions are contemplated.

Figure 1:
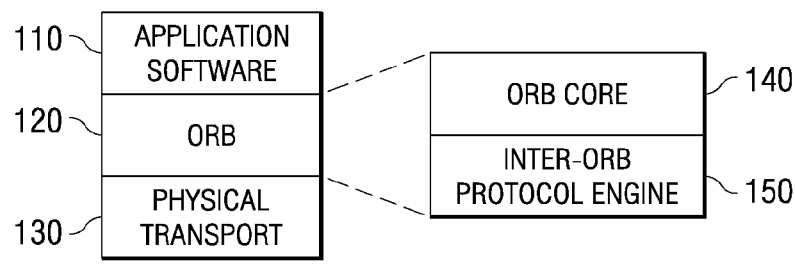
FIG. 1 is a representative illustration of a distributed computing environment.

FIG. 1 is a simplified representation of a distributed computing environment. When application software 110, acting as a client, sends a communication to a server object implementation (not shown), object request broker (ORB) 120 is the entity that is responsible for locating the server object implementation, for preparing the server object implementation to receive the request, and for transforming the request into a format suitable for transport to the server object implementation over physical transport 130. ORB 120 insulates application software 110 from requiring any knowledge of the physical location of the server object implementation and from requiring any knowledge of the nature of physical transport 130. Should the server object implementation send a reply communication back to application software 110, ORB 120 is also responsible for receiving the reply communication transmitted on physical transport 130 and for transforming the low-level octet sequence into the reply for dispatch to application software 110.

As shown in FIG. 1, ORB 120 comprises ORB core 140 and inter-ORB protocol engine 150. Inter-ORB protocol engine 150 assembles inter-ORB protocol messages and encodes information to be shared between clients and servers. Inter-ORB protocol engine 150, also known as a CODEC engine or a marshalling engine, transforms object communications from application software 110 into low-level octet sequences suitable for transport over physical transport 130 and also transforms low-level octet sequences received over physical transport 130 into object communications for dispatch to application software 110. Embodiments of the disclosed invention specify methods for hardware accelerating inter-ORB protocol engine 150.

Figure 2:
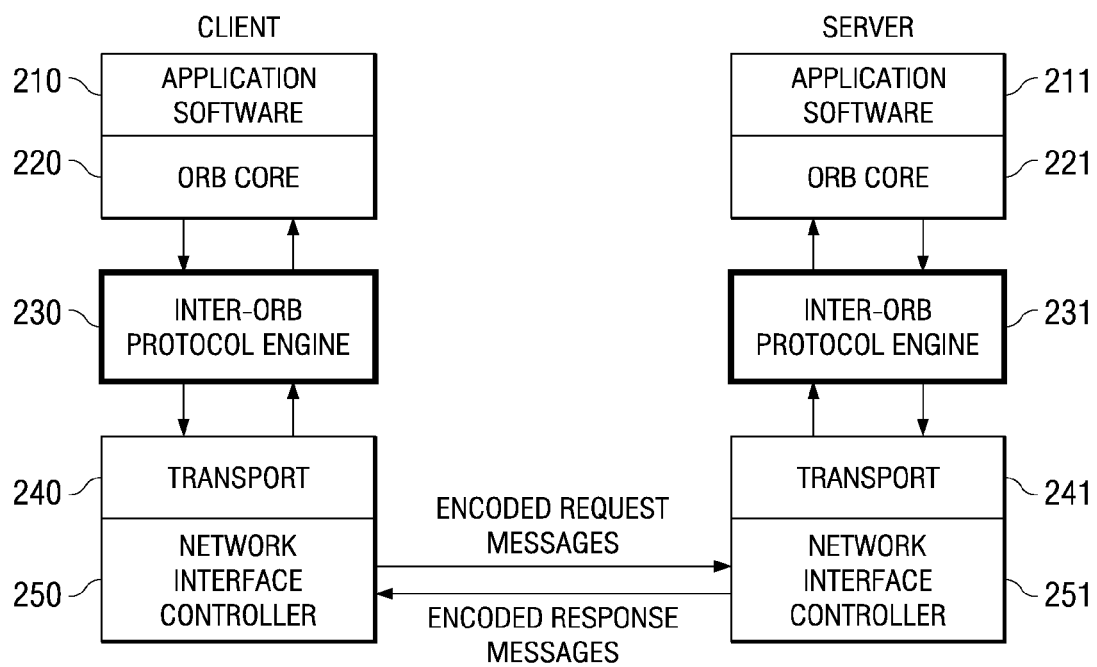
FIG. 2 is a representative illustration of a distributed computing environment.

FIG. 2 is a more detailed representation of a distributed computing environment. In FIG. 2, client application software object 210 sends a request that requires a response to server application software object 211. To achieve this, client application software object 210 simply executes a procedure call with the parameters as defined by the interface to server application software object 211 and receives a return value. Neither application need be aware of the actual mechanism employed to achieve this simple communication, because object request brokers (ORBs) on each side of the physical transport handle all the details. First, client-side ORB core 220 intercepts the communication, in this case a request, sent by application software 210. Client-side inter-ORB protocol engine 230 then transforms the request into a low-level octet sequence for physical transport. Server-side inter-ORB protocol engine 231 then transforms the low-level octet sequence back into the request which passes through server-side ORB core 221 en route to destination server application software object 211. The entire procedure then takes place in reverse as server application software object 211 sends a reply to client application software object 210. Server-side ORB core 221 intercept the communication, in this case a reply, and server-side inter-ORB protocol engine 231 transforms the reply into a low-level octet sequence for physical transport. Client-side inter-ORB protocol engine 230 then transforms the low-level octet sequence back into the reply which passes through client-side ORB core 220 en route to destination client application software object 210. Embodiments of the disclosed invention specify methods for hardware accelerating client-side inter-ORB protocol engine 230 and server-side inter-ORB protocol engine 231.

Figure 3:
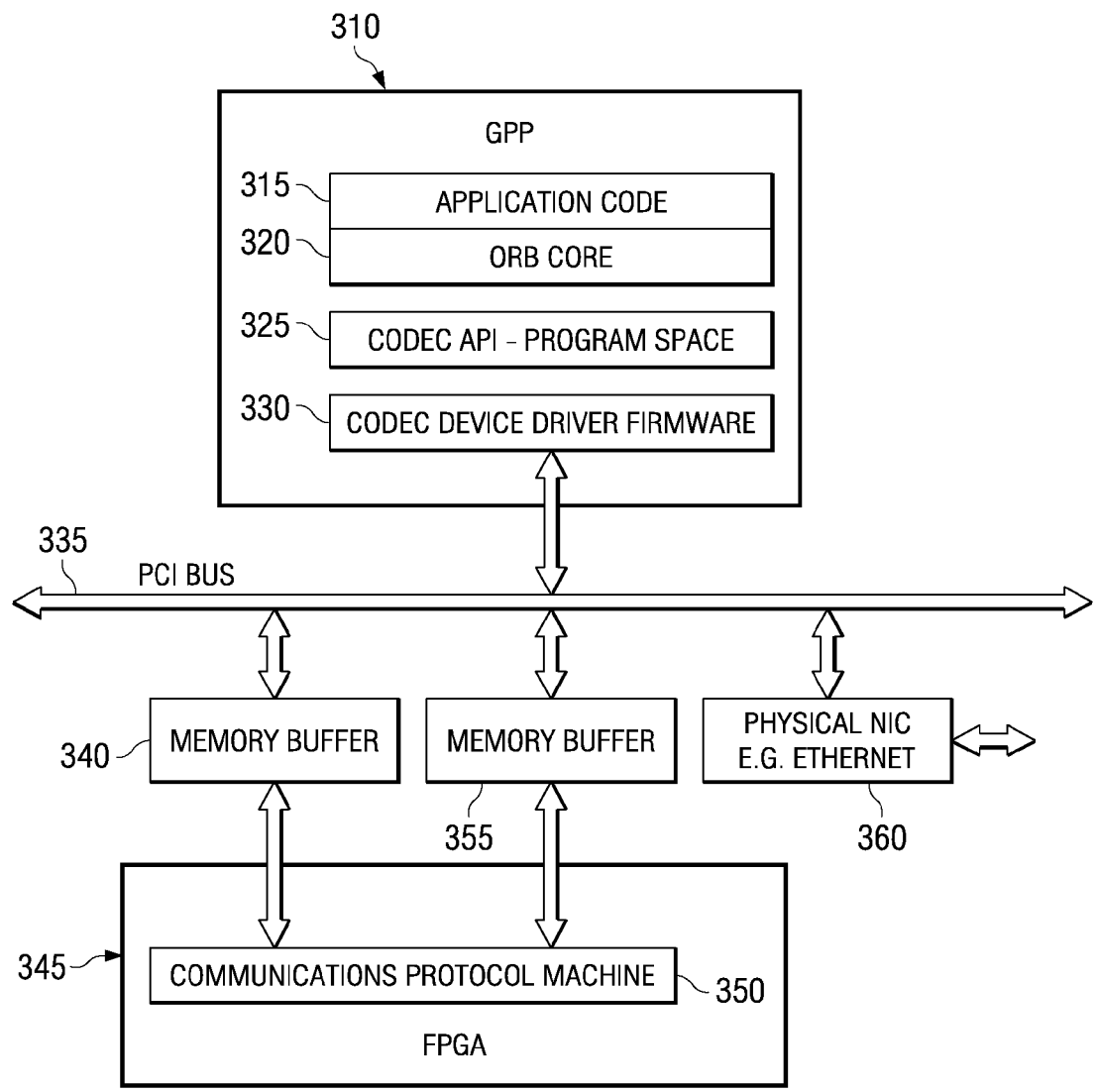
FIG. 3 illustrates a distributed computing environment employing an embodiment of a communications protocol machine synthesized onto a field programmable gate array (FPGA).

FIG. 3 illustrates a distributed computing system employing an embodiment of the disclosed invention. In FIG. 3, communications to and from application software object 315 are channeled through ORB core 320 and are processed by communications protocol machine 350. Communications protocol machine 350 is an inter-ORB protocol engine specified with a hardware description language and synthesized onto hardware platform 345. A hardware description language is any computer language used for formal description of electronic circuits. Preferred embodiments of the disclosed invention employ Very High Speed Integrated Circuit Hardware Description Language (VHDL), although other hardware description languages are contemplated, such as Verilog and SystemC.

In the preferred embodiment represented in FIG. 3, communications protocol machine 350 is synthesized onto a programmable logic device, specifically a field programmable gate array (FPGA). Other embodiments of the disclosed invention contemplate the use of other programmable logic devices for the hardware platform. Still other embodiments contemplate the use of an application specific integrated circuit (ASIC) for the hardware platform.

For communications outbound from application software object 315, communications protocol machine 350 waits for an indication from ORB core 320 that the object communication is available in memory buffer 340. Upon receiving such an indication, communications protocol machine 350 retrieves the object communication from memory buffer 340, transforms the object communication into a low-level octet sequence, and stores the low-level octet sequence into memory buffer 355. Although FIG. 3 represents memory buffer 340 and memory buffer 355 as distinct entities, these buffers may actually reside in the same physical memory location.

After transforming the object communication into a low-level octet sequence, communications protocol machine 350 sends an indication that the low-level octet sequence is available for physical transport 360. In the embodiment of FIG. 3, control is not returned to program space 310 after communications protocol machine 350 transforms the object communication into a low-level octet sequence. Rather, device driver 330 passes the low-level octet sequence directly to transport 360. Consequently, the ORB developer and the transport developer are dependent on one other.

For communications inbound to application software object 315, communications protocol machine 350 waits for an indication that a low-level octet sequence is available in memory buffer 355. Upon receiving such an indication, communications protocol machine 350 retrieves the low-level octet sequence from memory buffer 355, transforms the low-level octet sequence into an object communication, and stores the object communication into memory buffer 340. Communications protocol machine 350 then sends an indication that the object communication is available for dispatch to application software object 315. In some embodiments, communications protocol machine 350 further asserts handshaking signals effectuating dispatch of the object communication to application software object 315.

Figure 4:
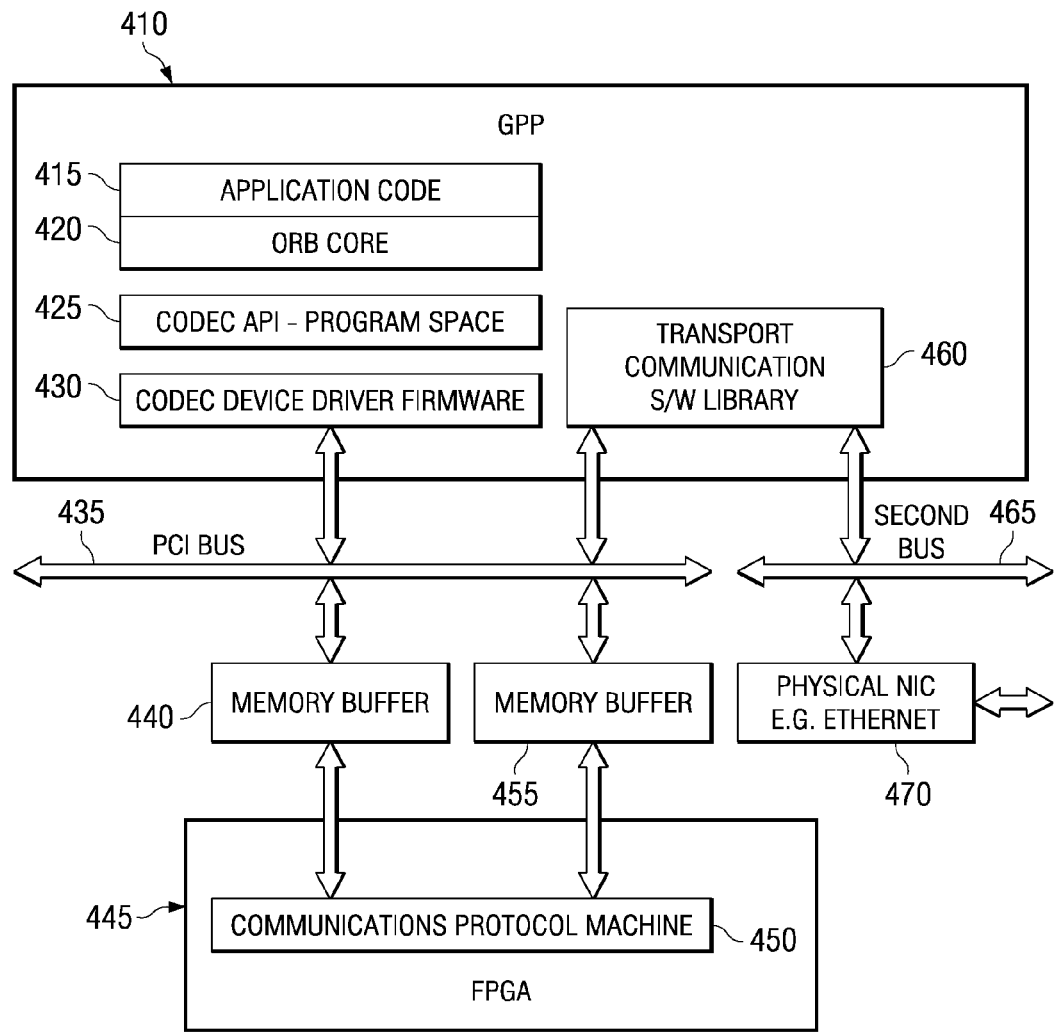
FIG. 4 illustrates a distributed computing environment employing an embodiment of a communications protocol machine synthesized onto a field programmable gate array (FPGA).

FIG. 4 illustrates a distributed computing system employing another embodiment of the disclosed invention. In FIG. 4, communications to and from application software object 415 are channeled through ORB core 420 and are processed by communications protocol machine 450. Communications protocol machine 450 is an inter-ORB protocol engine specified with a hardware description language and synthesized onto hardware platform 445. In this representative example, communications protocol machine 450 is synthesized onto a field programmable gate array (FPGA).

For communications outbound from application software object 415, communications protocol machine 450 waits for an indication from ORB core 420 that the object communication is available in memory buffer 440. Upon receiving such an indication, communications protocol machine 450 retrieves the object communication from memory buffer 440, transforms the object communication into a low-level octet sequence, and stores the low-level octet sequence into memory buffer 455. Although FIG. 4 represents memory buffer 440 and memory buffer 455 as distinct entities, these buffers may actually reside in the same physical memory location.

After transforming the object communication into a low-level octet sequence, communications protocol machine 450 then sends an indication that the low-level octet sequence is available for physical transport 470. In the embodiment of FIG. 4, control is returned to program space 410 after communications protocol machine 450 transforms the object communication into a low-level octet sequence. Program space 460 then passes the low-level octet sequence to the transport 470. Consequently, the ORB developer and the transport developer remain independent from one another.

For communications inbound to application software object 415, communications protocol machine 450 waits for an indication that a low-level octet sequence is available in memory buffer 455. Upon receiving such an indication, communications protocol machine 450 retrieves the low-level octet sequence from memory buffer 455, transforms the low-level octet sequence into an object communication, and stores the object communication into memory buffer 440. Communications protocol machine 450 then sends an indication that the object communication is available for dispatch to application software object 415. In some embodiments, communications protocol machine 450 further asserts handshaking signals effectuating dispatch of the object communication to application software object 415.

Figure 5:
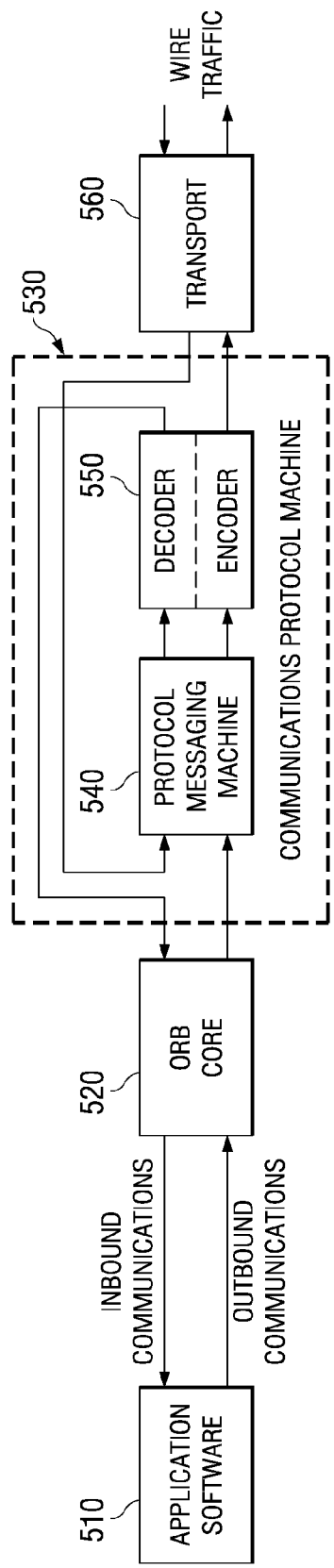
FIG. 5 illustrates an embodiment of a communications protocol machine comprising a protocol messaging machine and an encoder/decoder.

FIG. 5 illustrates an embodiment of the disclosed invention wherein communications protocol machine 530, an inter-ORB protocol engine specified with a hardware description language and synthesized onto a hardware platform, is implemented with two distinct elements: protocol messaging machine 540 and encoder/decoder 550. When application software 510 sends an outbound communication to an object implementation (not shown), communications protocol machine 530 transforms the object communication into a low-level octet sequence for transport 560. The octet, or byte, is the fundamental unit of data in transport. It is a raw 8-bit entity used by the inter-ORB protocol engine as a building block for inter-ORB messaging and data transport. Protocol messaging machine 540 receives the object communication and generates a sequence of octets comprising one or more inter-ORB message headers that describe the object being called. Examples of information contained in the header are the target object address, the type of communication, the method name, and the endian-ness. Because communications protocol machine 530 shares a communications protocol with the communications protocol machine associated with the target object, the header generated by protocol messaging machine 540 will be evaluated and understood by the communications protocol machine associated with the target object that receives the low-level octet sequence.

In an exemplary embodiment, the ORBs associated with the communications protocol machine support a subset of the Common Object Request Broker Architecture (CORBA) as specified by the Object Management Group (OMG) in version 3.0 of its Common Object Request Broker Architecture (CORBA) specification, hereby incorporated by reference in its entirety into the specification of this patent application. In this embodiment, protocol messaging machine 540 generates a sequence of octets comprising a General Inter-ORB Protocol (GIOP) message header that identifies the appropriate GIOP message type. Protocol messaging machine 540 then generates a sequence of octets comprising a secondary message header. The structure of this secondary message header is dependent upon the GIOP message type identified in the primary header. GIOP message types, GIOP message structure, GIOP message header structure, and GIOP message type header structures are all described in version 3.0 of OMG's CORBA specification.

After generating the one or more inter-ORB message headers, encoder/decoder 550 generates a message body by encoding each data type associated with the object communication according to a set of encoding/decoding rules. Where there are no data types associated with the object communication, no encoding is required. In that case, the low-level octet sequence for transport 560 will contain header information only and no message body. An example of an object communication with no associated data types is a void function call that passes no parameters, for example, void f( ).

In an exemplary embodiment, the set of encoding/decoding rules applied by encoder/decoder 550 is Common Data Representation (CDR). CDR is a transfer syntax for mapping data types into a low-level octet sequence for "on-the-wire" transfer between ORBs. CDR is described fully in version 3.0 of OMG's CORBA specification, and requires that machines with a common byte order may exchange messages without byte swapping. When communicating machines have a different byte order, the message originator determines the message byte order, and the receiver is responsible for swapping bytes to match its native ordering. A flag in the message header indicates the appropriate byte order. Byte order is also referred to as "endian-ness." CDR also requires that data types be aligned on their natural boundaries within the message body. Other embodiments of the disclosed invention contemplate the use of other sets of encoding/decoding rules, such as XDR and CCDR, for example.

When an inbound communication from an object implementation (not shown) is received from transport 560, communications protocol machine 530 transforms the low-level octet sequence into an object communication for dispatch to application software 510. Protocol messaging machine 540 receives the low-level octet sequence comprising one or more inter-ORB message headers and evaluates the message headers. In an exemplary embodiment, the ORBs associated with the communications protocol machine support a subset of the Common Object Request Broker Architecture (CORBA) as specified by the Object Management Group (OMG) in version 3.0 of its Common Object Request Broker Architecture (CORBA) specification. In this embodiment, protocol messaging machine 540 evaluates the sequence of octets comprising a General Inter-ORB Protocol (GIOP) message header and identifies the appropriate GIOP message type. Protocol messaging machine 540 then evaluates the secondary message header unique to the GIOP message type. GIOP message types, GIOP message structure, GIOP message header structure, and GIOP message type header structures are all described in version 3.0 of OMG's CORBA specification.

In some embodiments of the disclosed invention, protocol messaging machine 540 demultiplexes the destination information contained in the secondary message header, specifically the object key and the operation name. Communications protocol machine 530 uses lookup tables implemented in memory to determine the destination of the incoming GIOP message.

After evaluating the one or more inter-ORB message headers, encoder/decoder 550 decodes the message body, if present, into the data types associated with the object communication according to a set of encoding/decoding rules. Where there are no data types associated with the object communication, no message body exists and therefore no decoding is required. In an exemplary embodiment, the set of encoding/decoding rules applied by encoder/decoder 550 is Common Data Representation (CDR). In other embodiments, XDR, CCDR, or some other set of encoding/decoding rules are used.

Figure 6:
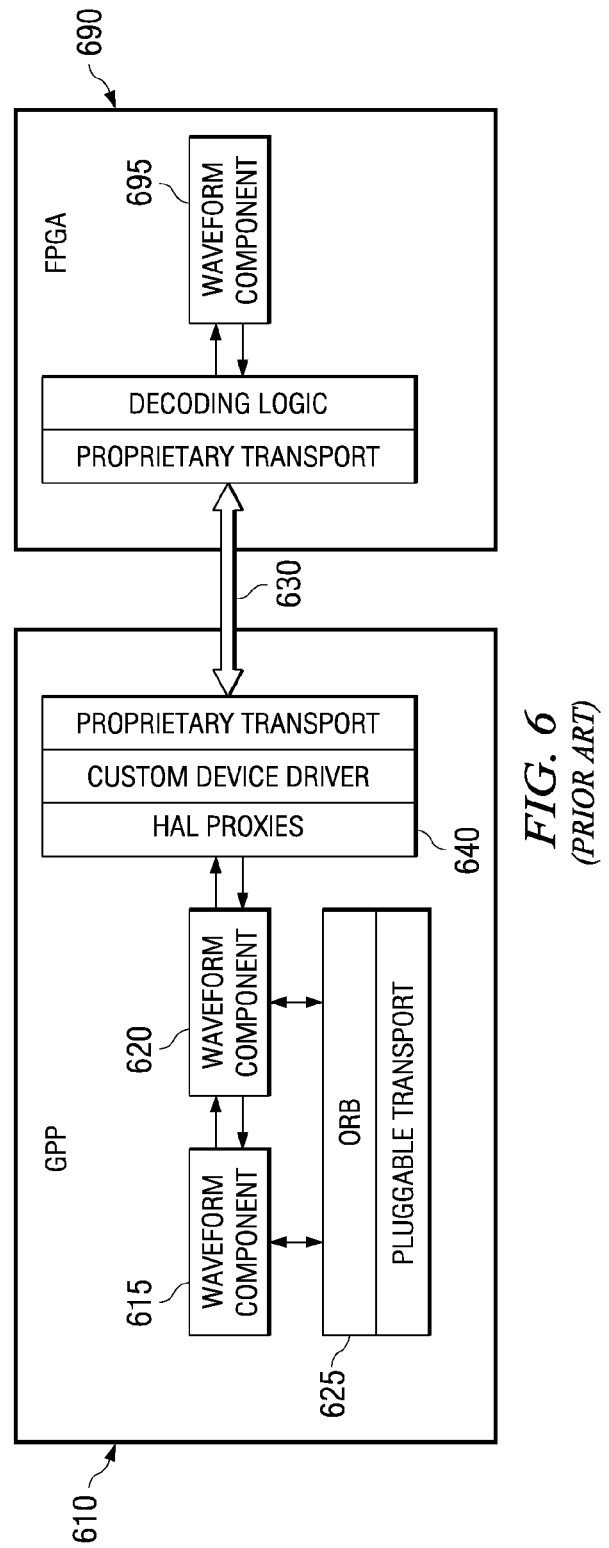
FIG. 6 is a representative illustration of a distributed computing environment comprising a hardware object residing in a field programmable gate array (FPGA).
Figure 7:
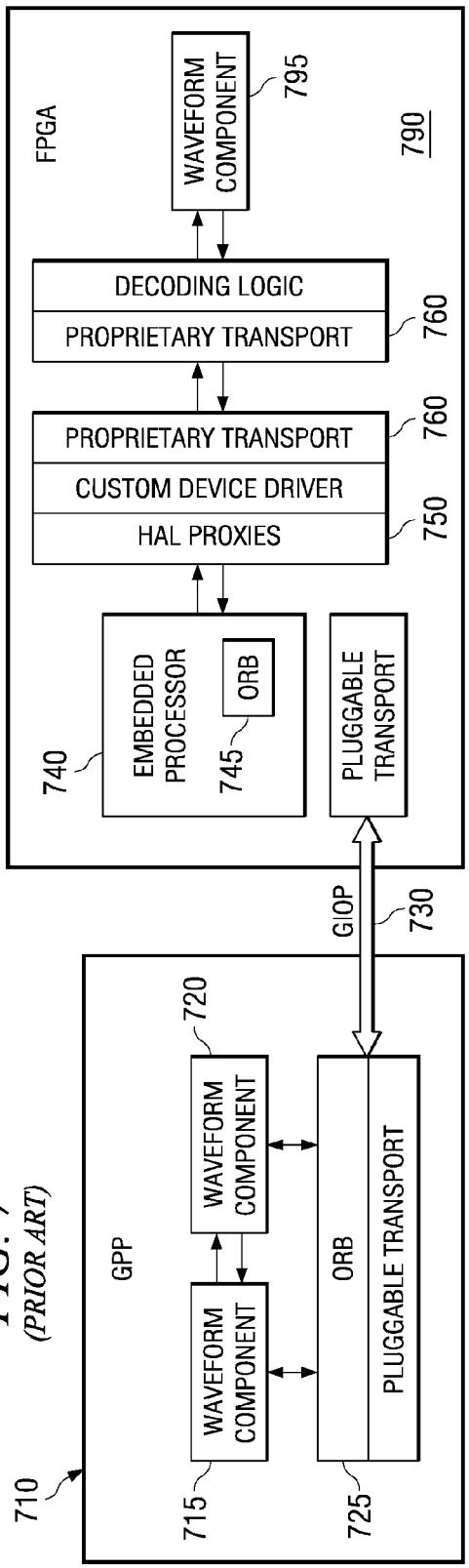
FIG. 7 is a representative illustration of a distributed computing environment comprising a hardware object residing in a field programmable gate array (FPGA).

FIG. 6 is a representative illustration of a computing environment comprising distributed software objects 615 and 620 running on processor 610 and hardware object 695 residing in hardware platform 690. In this particular example, hardware object 695 resides in a field programmable gate array (FPGA). Custom proxy 640, also known as a hardware abstraction layer (HAL), resides in the general purpose processor and enables software objects 615 and 620 to communicate with hardware object 695 over proprietary transport 630. Proxies such as custom proxy 640 tend to increase latency and reduce throughput. In FIG. 7, the same basic computing environment is represented, but custom proxy 750 and proprietary transport 760 have been relocated to hardware platform 790, represented here as an FPGA. General purpose processing core 740 is embedded into FPGA 790 and supports software ORB functionality 745 between software objects 715 and 720 and hardware object 795. This approach tends to require significant gate count and memory utilization and generally these processing cores cannot be clocked fast enough to deal with ever-increasing performance requirements. In the examples of FIG. 6 and FIG. 7, all objects are represented as waveform components, but other object representations are contemplated.

Figure 8:
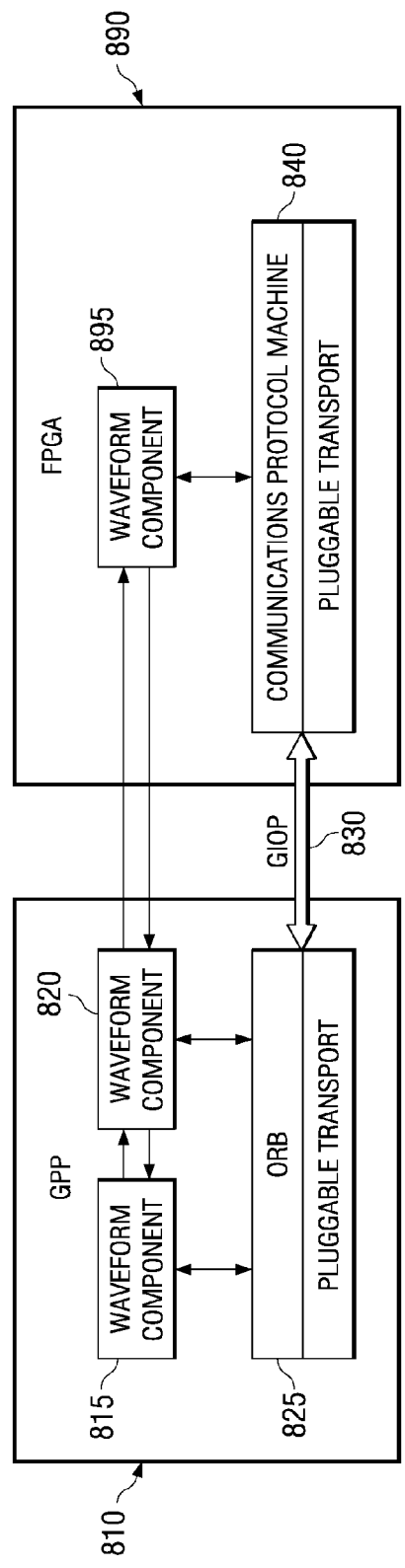
FIG. 8 illustrates a distributed computing environment comprising a hardware object residing in a field programmable gate array (FPGA) employing an embodiment of a communications protocol machine synthesized onto the FPGA.

FIG. 8 represents an embodiment of the disclosed invention wherein communications protocol machine 840 is a hardware ORB specified with a hardware description language (HDL) and synthesized onto hardware platform 890, represented here as an FPGA. The hardware ORB 840 allows software objects 815 and 820 located on external processor 810 to communicate with hardware object 895 located on hardware platform 890 without the need for a proxy or embedded processor. In this embodiment, communications protocol machine 840 resides between hardware object 895 and the local transport and takes the place of the address decode block found in typical bus interface designs. The basic design process of the FPGA is unchanged as it relates to hardware and system bus performance considerations. In other embodiments of the disclosed invention, hardware ORB 840 is connected to multiple hardware objects located on hardware platform 890 and routes data to the appropriate object via a handshaking interface. In the embodiment shown in FIG. 8, all objects are represented as waveform components, but other object representations are contemplated.

In typical existing designs, local processor 810 communicates with hardware object 895 inside the FPGA via the processor bus or some other local transport such as Ethernet. Each accessible register and memory within the FPGA is assigned a location in the processor's address map. Data bound for the FPGA is partitioned into packets with the address of the destination and may be further encapsulated in the format of the local transport. Logic on the receive side strips away the transport encapsulation and passes the data packets to the local address decode logic. The address is decoded and the data is sent to its location via a data bus along with the required read or write strobe.

In the case of the embodiment of the disclosed invention illustrated by FIG. 8, each function performed by the hardware object is given an operation name and its properties are described in Interface Description Language (IDL), a canonical language for describing interfaces used to exchange messages in a distributed environment. IDL is described in version 3.0 of OMG's CORBA specification. The operation may include several accessible memory elements such as registers, FIFOs, RAM, etc. Memory elements can be accessed alone or in groups depending on how they are described in IDL. If it is desired to write a register and read it back at a different time, the register would require two operation names: one for write and one for read. If it is desirable to write a register and read the results immediately, it could be described as a single operation with an inout parameter.

Once the object's operation interfaces are described in terms of IDL, an IDL to HDL compiler parses the IDL and generates HDL skeletons to forward GIOP requests and send back GIOP replies from HDL-based implementations housed in the hardware platform. The IDL compiler creates three HDL source files and a text file for each IDL file. The HDL files contain the IDL-derived information needed when synthesizing the hardware ORB. The text file is an information file to aid developers, and it shows how the hardware ORB maps IDL operations and parameters to data ports. The text file lists each parameter and return type of each operation in the interface, and shows the IDL type, the direction, the data width in bytes, and the read or write port used for each parameter. After the compiler has parameterized communications protocol machine 840, software ORB 825 can access the object functionality via CORBA GIOP messages. ORB 825 encapsulates the data in a GIOP message and passes this to the local transport.

Communications protocol machine 840 is a hardware implementation of a CORBA ORB. It supports a general subset of CORBA functions and a preferred embodiment is described in portable HDL, such as VHDL, that can be synthesized onto any FPGA or ASIC platform. Communications protocol machine 840 is responsible for implementing the transfer syntax used in CORBA messages. The core unmarshalls the incoming GIOP octet stream and extracts header and data fields while discarding padding. Endian conversion is performed on all incoming data based on information in the GIOP message header. In the incoming direction, communications protocol machine 840 performs operation name demultiplexing to determine which object the data in the GIOP message is being transferred to. Message data is then extracted for transfer to the appropriate logic.

If a message indicates that response is expected, communications protocol machine 840 generates a reply message and will perform a read operation to an object if necessary to obtain data for the reply. It then populates the header field and aligns the data. When a reply message has been built, communication protocol machine 840 transfers the data to the local transport via a FIFO-like interface.

Preferred embodiments of communications protocol machine 840 can also be configured to support FPGA hardware objects that act as clients. When the embedded object makes a function call request, communications protocol machine 840 will gather the data from the object and then marshall a GIOP request message and send it to the desired client via the local transport. Any returning reply messages will be processed and the data passed back to the client.

Figure 9:
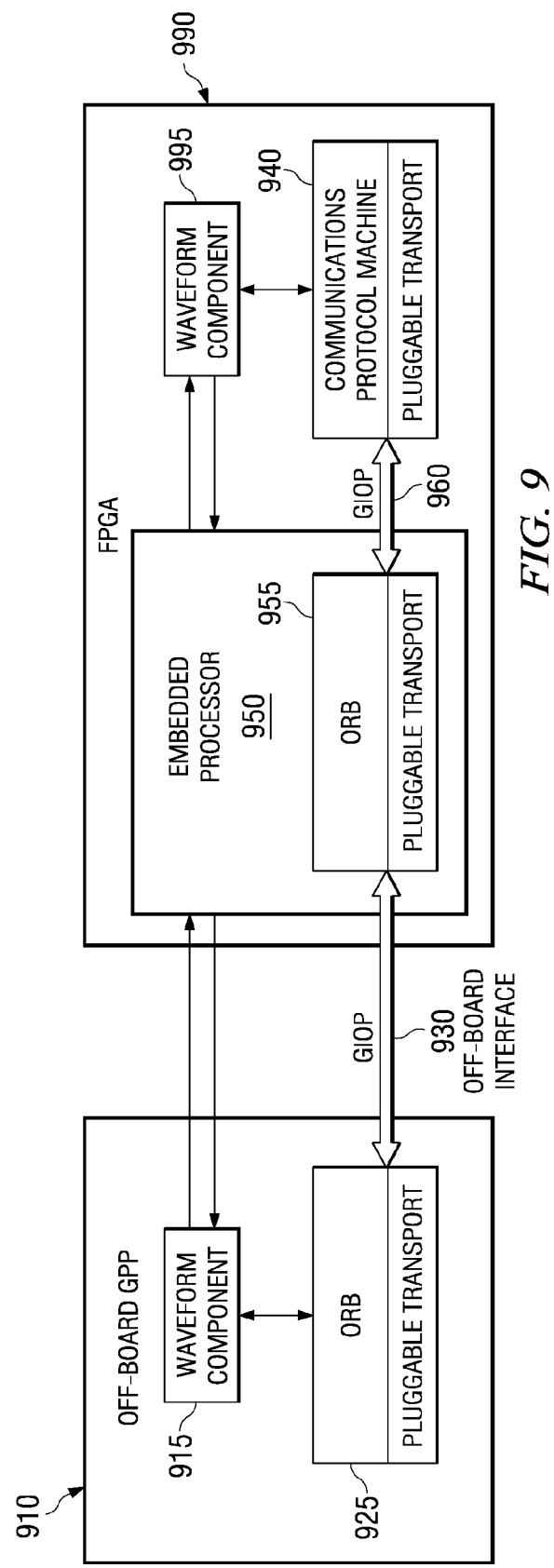
FIG. 9 illustrates a distributed computing environment comprising a hardware object residing in a field programmable gate array (FPGA) employing an embodiment of a communications protocol machine synthesized onto the FPGA.

FIG. 9 represents an embodiment of the disclosed invention wherein communications protocol machine 940 is a hardware ORB specified with a hardware description language and synthesized onto hardware platform 990, represented here as an FPGA. The hardware ORB 940 allows software object 915 located on external processor 910 and objects residing within embedded processor 950 to communicate with hardware object 995 located on hardware platform 990 without the need for a proxy. In this embodiment, communications protocol machine 940 resides between hardware object 995 and the local transport and functions as described above for FIG. 8. In other embodiments, hardware ORB 940 is connected to multiple hardware objects located on hardware platform 990 and routes data to the appropriate object via a handshaking interface. In the embodiment shown in FIG. 9, all objects are represented as waveform components, but other object representations are contemplated.

While various embodiments of a method and apparatus for accelerating GIOP protocol have been described above, it should be understood that they have been presented by way of example only, and not limitation. Thus, the breadth and scope of the invention should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

We claim:

1. A method of specifying, with a hardware description language (HDL), a communications protocol machine, wherein the communications protocol machine is associated with an object request broker (ORB), wherein the object request broker (ORB) is associated with an object communication, wherein the object communication is associated with an object implementation, and wherein the communications protocol machine transforms the object communication into a low-level octet sequence for transport, the method comprising:

generating an HDL description of a first component of the communications protocol machine, wherein the first component is operated for receiving an indication that the object communication is available in a first memory buffer;

generating an HDL description of a second component of the communications protocol machine, wherein the second component is operated for retrieving the object communication from the first memory buffer;

generating an HDL description of a third component of the communications protocol machine, wherein the third component is operated for transforming the object communication into the low-level octet sequence;

generating an HDL description of a fourth component of the communications protocol machine, wherein the fourth component is operated for storing the low-level octet sequence in a second memory buffer; and generating an HDL description of a fifth component of the communications protocol machine, wherein the fifth component is operated for sending an indication that the low-level octet sequence is available for transport, wherein the object request broker (ORB) associated with the communications protocol machine supports a subset of the Common Object Request Broker Architecture (CORBA), wherein the object communication is associated with a number of data types, and wherein the transforming the object communication into the low-level octet sequence comprises:

generating a primary message header comprising a General Inter-ORB Protocol (GIOP) message header that identifies a GIOP message type;

generating a secondary message header associated with the GIOP message type; and generating a message body comprising encoding each of the number of data types associated with the object communication.

2. The method of claim 1, wherein the hardware description language can be synthesized onto a hardware platform.

3. The method of claim 2, wherein the hardware description language is selected from the group consisting of:
Very High Speed Integrated Circuit Hardware Description Language (VHDL);
Verilog; and
SystemC.

4. The method of claim 2, wherein the hardware platform is selected from the group consisting of:
a programmable logic device (PLD); and
an application specific integrated circuit (ASIC).

5. The method of claim 4, wherein the programmable logic device is a field programmable gate array (FPGA).

6. The method of claim 1, wherein the first memory buffer and the second memory buffer occupy the same physical memory.

7. The method of claim 1, wherein the communications protocol machine is invoked through an application programming interface (API) in the object request broker (ORB), rendering the communications protocol machine transparent to an object request broker (ORB) developer.

8. The method of claim 1, wherein transport is accomplished using a connection-oriented transport protocol.

9. The method of claim 8, wherein the connection-oriented transport protocol is selected from the group consisting of:
Transmission Control Protocol (TCP); and
Reliable User Datagram Protocol (RUDP).

10. The method of claim 1, wherein transport is accomplished using a physical layer transport protocol.

11. The method of claim 10, wherein the physical layer transport protocol is selected from the group consisting of:
RapidIO; and
Ethernet.

12. The method of claim 1, wherein the object implementation is a hardware object residing within a hardware platform.

13. The method of claim 1, wherein the number of data types is zero.

14. The method of claim 1, wherein the encoding each of the number of data types associated with the object communication comprises applying a set of encoding/decoding rules to each of the number of data types associated with the object communication.

15. The method of claim 14, wherein the set of encoding/decoding rules is selected from the group consisting of:
the Common Data Representation (CDR) encoding/decoding rules;
the XDR encoding/decoding rules; and
the CCDR encoding/decoding rules.

16. A computer-readable physical storage medium comprising hardware description language (HDL) instructions generated by the method of claim 1.

17. A hardware platform synthesized according to the HDL description generated by the method of claim 1.

18. A method of specifying, with a hardware description language (HDL), a communications protocol machine, wherein the communications protocol machine is associated with an object request broker (ORB), wherein the object request broker (ORB) is associated with an object communication, wherein the object communication is associated with an object implementation, and wherein the communications protocol machine transforms a low-level octet sequence into the object communication for dispatch to the object implementation, the method comprising:

generating an HDL description of a first component of the communications protocol machine, wherein the first component is operated for receiving an indication that the low-level octet sequence is available in a first memory buffer;

generating an HDL description of a second component of the communications protocol machine, wherein the second component is operated for retrieving the low-level octet sequence from the first memory buffer;

generating an HDL description of a third component of the communications protocol machine, wherein the third component is operated for transforming the low-level octet sequence into the object communication;

generating an HDL description of a fourth component of the communications protocol machine, wherein the fourth component is operated for storing the object communication in a second memory buffer; and generating an HDL description of a fifth component of the communications protocol machine, wherein the fifth component is operated for sending an indication that the object communication is available for dispatch to the object implementation, wherein the object request broker (ORB) associated with the communications protocol machine supports a subset of the Common Object Request Broker Architecture (CORBA), wherein the object communication is associated with a number of data types, wherein the low-level octet sequence comprises a primary message header comprising a General Inter-ORB Protocol (GIOP) message header that identifies a GIOP message type, a secondary message header associated with the GIOP message type, and a message body comprising the data types associated with the object communication, and wherein the transforming the low-level octet sequence into the object communication comprises:

evaluating the primary message header;
evaluating the secondary message header;
decoding the message body; and
generating the object communication from the primary message header, the secondary message header, and the message body.

19. The method of claim 18, wherein the hardware description language can be synthesized onto a hardware platform.

20. The method of claim 19, wherein the hardware description language is selected from the group consisting of:
Very High Speed Integrated Circuit Hardware Description Language (VHDL);
Verilog; and
SystemC.

21. The method of claim 19, wherein the hardware platform is selected from the group consisting of:
a programmable logic device (PLD); and
an application specific integrated circuit (ASIC).

22. The method of claim 21, wherein the programmable logic device is a field programmable gate array (FPGA).

23. The method of claim 18, wherein the first memory buffer and the second memory buffer occupy the same physical memory.

24. The method of claim 18, wherein the communications protocol machine is invoked through an application programming interface (API) in the object request broker (ORB), rendering the communications protocol machine transparent to an object request broker (ORB) developer.

25. The method of claim 18, wherein the object implementation is a hardware object residing within a hardware platform.

26. The method of claim 18, wherein the number of data types is zero.

27. The method of claim 18, wherein the secondary message header comprises an object key and an operation name, and wherein the evaluating the secondary message header comprises demultiplexing the object key and the operation name to identify the object implementation.

28. The method of claim 18, wherein the decoding the message body comprises applying a set of encoding/decoding rules to the message body.

29. The method of claim 28, wherein the set of encoding/decoding rules is selected from the group consisting of:

the Common Data Representation (CDR) encoding/decoding rules;
the XDR encoding/decoding rules; and
the CCDR encoding/decoding rules.

30. The method of claim 18, further comprising:
generating an HDL description of a sixth component of the communications protocol machine, wherein the sixth component is operated for asserting handshaking signals effectuating dispatch of the object communication to the object implementation.

31. A computer-readable physical storage medium comprising hardware description language (HDL) instructions generated by the method of claim 18.

32. A hardware platform synthesized according to the HDL description generated by the method of claim 18.

* * * * *